Figure 1:
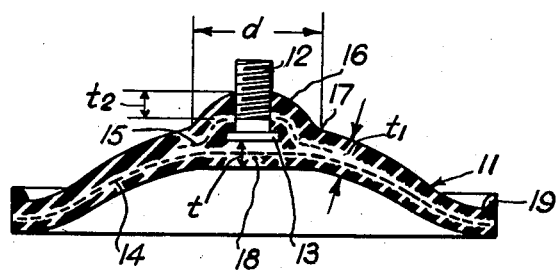

March 3, 1964 R. H. PRICE 3,123,336
DIAPHRAGM VALVES
Filed Oct. 28, 1958

INVENTOR
Richard Hector Price
BY
ATTORNEY

3,123,336
DIAPHRAGM VALVES

Richard Hector Price, Cwmbran, England, assignor to Saunders Valve Company Limited, Cwmbran, England, a British company
Filed Oct. 28, 1958, Ser. No. 770,026
Claims priority, application Great Britain Nov. 8, 1957
1 Claim. (Cl. 251—331)

This invention relates to diaphragm valves having embedded in the diaphragm the head of a stud which enables it to be pulled positively away from the seating when the valve is opened. The diaphragm is usually moulded in a form corresponding to the open position, but it is possible to mould it in a form corresponding to the closed position. A diaphragm valve of the weir type having a stud embedded in the diaphragm is shown in U.S.A. patent specification No. 1,855,991 and in many later patent specifications such as U.S. Patent No. 2,605,991 of August 5, 1952.

The diaphragm in such a valve is usually made of an elastomer such as a composition based on natural or synthetic rubber depending on the fluid to be controlled, with fabric reinforcement. To obtain a firm anchorage for the head of the stud and enable the reinforcement to be engaged with the shank of the stud and with a view to preventing the stud from pulling out hitherto a cylindrical boss has been formed on the back of the diaphragm, this boss fitting into a corresponding recess in the compressor of the valve so that the boss is laterally enclosed as shown in British patent specification No. 434,665. In practice the head of the stud which is quite thin is located so that the thickness beneath it of the diaphragm is substantially equal to the thickness of the diaphragm outside the boss so that in the case of a weir type valve there is a substantially constant effective thickness of elastomer over the weir when the valve is closed.

Experience has shown that one of the regions at which failure of the diaphragm may occur in service is on circle opposite the junction of the outside of the boss with the remainder of the diaphragm, suggesting that in spite of the flexibility and resilience of the material there is a concentration of stress at this circle. It is also found that with a cylindrical boss, when the mould in which the diaphragm is made is closed, forces which include a shearing force and a tensile force are imposed on the part of the reinforcement which rises into the boss and engages the shank of the stud, and these forces sometimes rises to an excessive value which shortens the life of the diaphragm. An object of the invention is to reduce stress concentrations and so increase the life of the diaphragm.

The ideal solution would be for the thickness of the diaphragm to be constant over the whole working area or only to vary in a smooth continuous manner, but this is impossible if the stud is to be anchored with adequate thickness of elastomer below its head.

According to the invention the diaphragm is provided with a boss of rounded contour and the boss is made no greater in height than is necessary to provide above the reinforcement which engages the shank of the stud a thickness of elastomer which is equal to or nearly equal to the thickness of the diaphragm outside the boss, while the stud itself is embedded to the usual extent that is with a thickness of elastomer below its head which is equal to or nearly equal to the thickness of the diaphragm outside the boss. The boss may take the form of a segment of a sphere which is substantially less than a hemisphere and the junction with the remaining surface of the back of the diaphragm is provided with a fillet of rounded section to avoid a circle of abrupt change in contour.

More specifically the nominal base diameter of the boss i.e. the diameter if no fillet were provided at the junction of its exterior surface with the rest of the diaphragm may be substantially greater than that of a cylindrical boss as hitherto made and may be ¼ of the diameter of the free area of the diaphragm i.e. of the diameter of the diaphragm within the clamped margin, while its height may be about equal to the thickness of the rest of the diaphragm at its location. Such a diameter may be provided by giving the boss a spherical radius of about ⅓th of the diameter of the free area of the diaphragm and its centre of curvature will be located just within the thickness of the diaphragm.

The recess in the valve compressor is made of corresponding form to the boss but it will be noted that the recess now no longer confines the boss laterally in the same manner as in the case of a cylindrical boss and recess.

Figure 2:
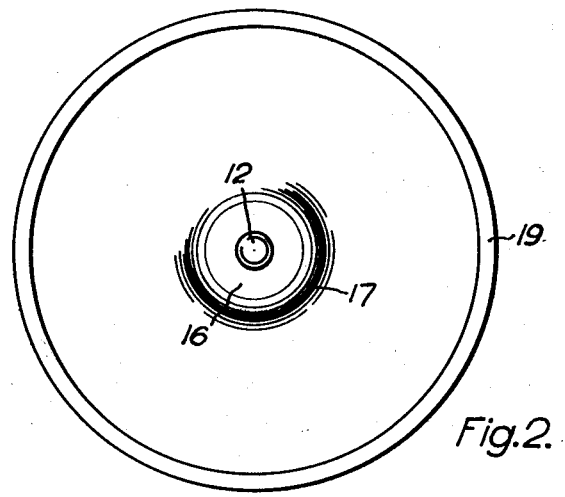

The invention will be further described with reference to the accompanying drawings in which
FIGURE 1 is an axial section, and
FIGURE 2 is a plan view of an example which is of circular outline.

The invention is equally applicable however to diaphragms in which while the bowed part is of circular outline the clamped margin is of substantially rectangular or similar outline as well known.

The diaphragm illustrated indicated generally by the numeral 11 is moulded in the form corresponding to the open position of the valve in which it is to be used. It is made of elastomer of a quality suitable for the intended service and is provided with a stud comprising a shank 12 having a thin flat head 13 embedded in the diaphragm with a thickness $t$ of elastomer beneath the head which is nearly as great as the thickness $t1$ away from the central zone. The diaphragm is also reinforced by two layers of fabric 14, 15, the former extending over the whole area of the diaphragm and the latter only over the central zone where it sweeps up and engages the shank 12. Both layers of fabric are arranged to leave a substantial thickness of elastomer between them and the head 13. On the upper side the diaphragm has an integral boss 16 of rounded contour which is of such height as to provide a thickness $t2$ of elastomer above the fabric 15 which is nearly equal to the thickness $t$ below the head; the thickness of the elastomer in the boss above the head 13 is approximately equal to the thickness $t1$. At the junction of the rounded contour of the boss with the rest of the diaphragm a rounded fillet 17 is provided running smoothly into the upper surface of the boss thus avoiding any abrupt change in contour. Further the thickness of the diaphragm decreases a little towards the outer periphery which also contributes to the reduction of stress concentration. The nominal base diameter $d$ of the boss is about ¼ of the diameter of the free area which in this example is very little less than the overall diameter, so that the boss is larger than would be the case with the prior art cylindrical boss. All features require much less abrupt changes in direction of the reinforcing fabirc 15 where it is swept up to engage the shank 12 which eases manufacture, reduces the risk of imposing excessive stress on the fabric and also makes the reinforcement more effective in its primary function.

In the illustrated example the boss 16 is of spherical contour about the centre 18. So produced it is substantially less than a hemisphere.

It has been found that with the boss according to the invention not only is the tendency of the diaphragm to fail on a circle at the centre of the diaphragm reduced but that satisfactory results are obtained in the case in which the valve is proportioned to use a diaphragm of smaller diameter in relation to the pipe bore than customary in the well known Saunders diaphragm valve as shown for example in U.S.A. patent specification No. 2,605,991 among many others, and in which accordingly the movement of the diaphragm between open and closed position is made relatively greater to maintain the good flow conditions obtained with a valve of the customary proportions. It is highly desirable in such a case that the diaphragm should be constructed as described in the said U.S.A. Patent No. 2,605,991. The diaphragm illustrated is such a diaphragm intended to move further between open and closed position than in a valve of the more usual proportions and it will be seen that the marginal part of the diaphragm which is clamped in the valve is in fact coned as specified in that patent. In addition the rim of the diaphragm is shown with a rib 19 which gives it a semi-fish-tail section whereby the material in this region is put under volume compression when clamped in place. This particular diaphragm is for a valve intended for use with milk or similar fluid liable to decompose when it is desirable to avoid a groove in the valve body below the diaphragm which is not easily cleaned but where the provision of a groove in the valve body is not objectionable there may be also a rib on the under side giving the form of a complete fish-tail section here as in British patent specification No. 622,204.

As shown the shank 12 of the stud is threaded to screw into the compressor in the valve in the well known manner but it may be attached in any other convenient way for example it may have a T head which may be in the form of a cross pin.

I claim:

A diaphragm for a diaphragm valve comprising a moulding of elastomer in the form of a diaphragm having a convex side, a central integral boss of wholly rounded contour on the convex side of the diaphragm as viewed with the latter in the free and open position of a valve surface against which the diaphragm is adapted to seat, said boss being of spherical contour substantially less than a hemisphere and with a fillet at the junction with the remaining surface of the diaphragm, a headed stud embedded in the diaphragm with its shank projecting centrally entirely through the boss and its head at a distance from the other face of the diaphragm such as to leave at least nearly the same thickness of elastomer as the thickness of the diaphragm outside the boss, and fabric reinforcement embedded in the diaphragm sweeping up into the boss and engaging the shank of the stud to leave a substantial thickness of elastomer between itself and the head of the stud, the height of the boss above the rest of the diaphragm being approximately equal to the thickness of the diaphragm outside the boss in this region.

References Cited in the file of this patent

UNITED STATES PATENTS

| | | |
|---|---|---|
| 2,324,880 | Rogers et al. | July 20, 1943 |
| 2,381,544 | Jacobsen | Aug. 7, 1945 |
| 2,605,991 | Kaye | Aug. 5, 1952 |
| 2,615,471 | McFarland | Oct. 28, 1952 |
| 2,675,758 | Hughes | Apr. 20, 1954 |
| 2,907,346 | Fortune | Oct. 6, 1959 |
| 2,947,325 | McFarland | Aug. 2, 1960 |

FOREIGN PATENTS

| | | |
|---|---|---|
| 685,935 | Great Britain | Jan. 14, 1953 |
| 205,610 | Australia | Jan. 14, 1955 |